United States Patent [19]
Ishida

[11] Patent Number: 5,835,348
[45] Date of Patent: Nov. 10, 1998

[54] MOVABLY MOUNTED HEAT RECEIVING PLATE

[75] Inventor: Yoshio Ishida, Osaka, Japan

[73] Assignee: Diamond Electric Mft., Japan

[21] Appl. No.: 739,285

[22] Filed: Oct. 29, 1996

[30]     Foreign Application Priority Data

Dec. 14, 1995 [JP] Japan .................................. 7-348093

[51] Int. Cl.[6] .................................................. H05K 7/20
[52] U.S. Cl. ...................... 361/699; 165/104.33; 361/687
[58] Field of Search .............. 62/259.2; 174/15, 174/2; 364/708.1; 165/80.3, 80.4, 104.22, 104.26, 104.33, 86, 185; 361/687, 699, 700, 704–706, 717–719

[56]     References Cited

U.S. PATENT DOCUMENTS

| | | | |
|---|---|---|---|
| 5,588,483 | 12/1996 | Ishida | 165/86 |
| 5,621,613 | 4/1997 | Haley | 361/687 |
| 5,646,822 | 7/1997 | Bhatia | 361/687 |

FOREIGN PATENT DOCUMENTS

| | | | |
|---|---|---|---|
| 4048693 | 2/1992 | Japan | 361/687 |

*Primary Examiner*—Gerald P. Tolin
*Attorney, Agent, or Firm*—Longacre & White

[57]     ABSTRACT

The present invention is to provide a heat sink used for a portable information processing apparatus, the casing of which has a recess in which an exchangeable arithmetic processor is accommodated. There is provided a heat receiving plate closely coming into contact with the arithmetic processor. The heat receiving plate includes a round hole portion arranged at one end. A heat pipe is inserted into the round hole portion. A fixing member is attached to the heat receiving plate at an outlet portion of the heat pipe arranged in the round hole portion. The heat receiving plate is fixed to the casing through the fixing member so that a hinge mechanism can be formed by the heat receiving plate and the heat pipe which is used as a fulcrum. At least a portion of the heat pipe is thermally connected with a radiating member.

6 Claims, 2 Drawing Sheets

MOVABLY MOUNTED HEAT RECEIVING PLATE

BACKGROUND OF THE INVENTION

The present invention relates to a heat sink used for cooling an arithmetic processor provided in a portable information processing apparatus.

In the field of information processing apparatus, the technological innovation of personal computers is remarkable. Especially, arithmetic processors (referred to as "MPU" hereinafter in this specification) such as MPU and CPU are making rapid progress, so that new products purchased by users become obsolete even in a half year in some cases. In order to meet the users' requirements, personal computer manufacturers adopt an MPU card replacing system in which MPU can be easily replaced with a new one. However, a large quantity of heat is generated by an MPU card manufactured recently, Therefore, it is necessary to provide a heat sink to the MPU card. Especially, in the case of a notebook type personal computer, it is important to take countermeasures against the generated heat so that it can be positively radiated.

The structure of a notebook type personal computer is described as follows. In general, the outside dimensions are the same as those of a notebook of size A4, and the thickness is approximately 5 cm. The notebook type personal computer includes a main body having a key board, and a liquid crystal display section, the shape of which is formed into a cover so that an upper surface of the main body can be covered with the liquid crystal display section. This crystal display section can be freely opened from and closed to the main body by a hinge mechanism. In the case of a notebook type personal computer, the total power consumption of which is 25 watt, about 15 watt, that is, about 60% of the total power consumption of the notebook type personal computer is consumed by the main body, and about 10 watt which is the rest of 40% is consumed by the crystal liquid display section.

As a radiating means for radiating the heat generated by a notebook type personal computer of the MPU card replacing system, the front and rear surfaces of the liquid crystal display section are used, by which heat generated by the electric power of 10 watt consumed by the liquid crystal section is relatively effectively radiated because the front and rear surfaces of the liquid crystal display section are open to the outside air. On the other hand, it is common that the heat generated by the electric power of 15 watt consumed by the main body is dissipated by a radiating member such as a heat sink directly attached and fixed to MPU. Accordingly, when MPU is replaced with a new one, the above radiating member is also replaced, or alternatively only MPU is replaced without replacing the radiating member. When both MPU and the radiating member are simultaneously replaced, the cost is raised. Further, since the radiating member is accommodated in a small space in the main body together with MPU, the size and shape of the radiating member are limited. Therefore, it is impossible to provide a sufficiently high radiating effect. As a result, reliability of the overall apparatus is deteriorated because there is a possibility of thermal runaway of MPU including MPU not having a radiating member.

SUMMARY OF THE INVENTION

The present invention has been accomplished in view of the above problems. It is an object of the present invention to provide a heat sink most appropriate for cooling an exchangeable MPU card, the heat generating density of which is high, used for a recent portable information processing apparatus.

In order to solve the above problems, the present invention is to provide a heat sink used for a portable information processing apparatus, the casing of which has a recess in which an exchangeable arithmetic processor is accommodated, the heat sink comprising: a heat receiving plate closely coming into contact with the arithmetic processor, the heat receiving plate including a round hole portion arranged at one end; a heat pipe inserted into the round hole portion; and a fixing member attached to the heat receiving plate at an outlet portion of the heat pipe arranged in the round hole portion, the heat receiving plate being fixed to the casing through the fixing member so that a hinge mechanism is formed by the heat receiving plate and the heat pipe which is used as a fulcrum, wherein at least a portion of the heat pipe is thermally connected with a radiation member.

DETAILED DESCRIPTION OF THE PREFERRED EMBODIMENTS

Figure 1:
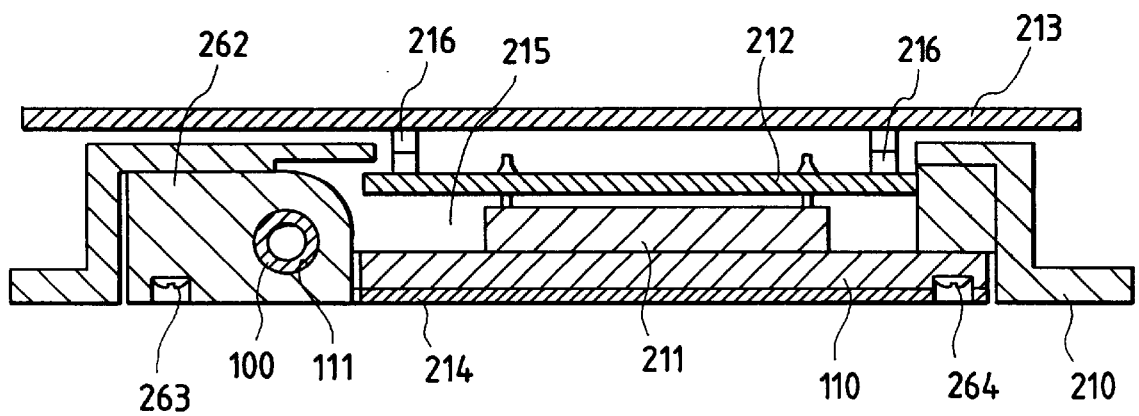
FIG. 1 is one cross-sectional side view taken along line 1—1 of FIG. 3 of an MPU mounting portion of the portable electronic apparatus of the embodiment of the present invention.
Figure 2:
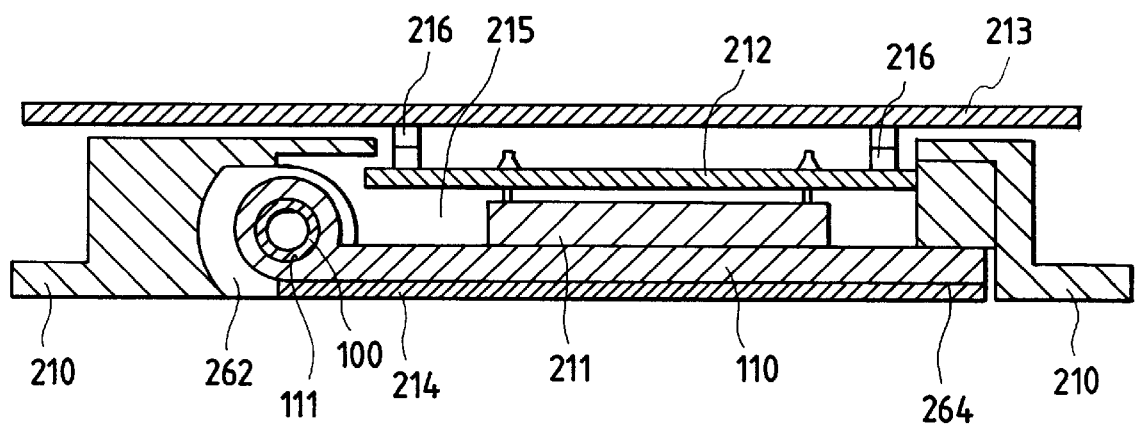
FIG. 2 is the other cross-sectional side view taken along line 2—2 of FIG. 3 of an MPU mounting portion of the portable electronic apparatus of the embodiment of the present invention.
Figure 3:
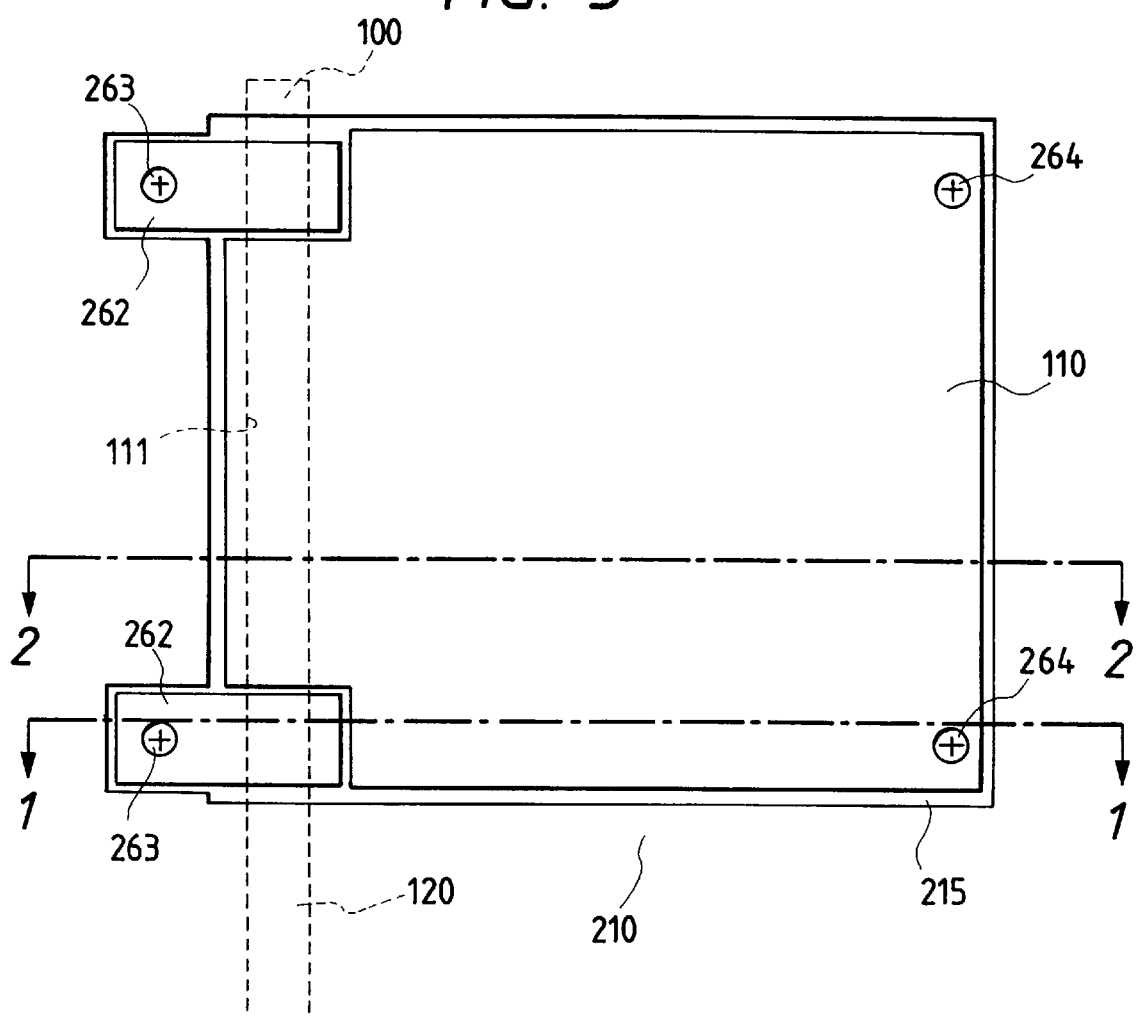
FIG. 3 is a bottom view of the portable electronic apparatus shown in FIGS. 1 and 2.

FIGS. 1 and 2 are cross-sectional side views of an MPU mounting portion of the portable electronic apparatus (notebook type personal computer) of the embodiment of the present invention. FIG. 3 is a bottom view of the portable electronic apparatus. In this connection, FIG. 1 is a cross-sectional view taken on line 1—1 in FIG. 3 in the arrow direction, and FIG. 2 is a cross-sectional view taken on line 2—2 in FIG. 3 in the arrow direction.

As shown in FIGS. 1, 2 and 3, there is provided a casing recess 215 in the casing 210 of the main body. In this casing recess 215, there is provided an MPU mounting auxiliary base plate 212 on which MPU 211 is mounted. This MPU mounting auxiliary base plate 212 is fixed to a primary base plate 213 via a connector 216. In case the grade of MPU should be enhanced to a higher grade in the future, MPU is arranged in such a manner that it can be detached from the primary base plate 213. When the apparatus is normally used, the casing recess 215 is closed by a casing cover 214.

Between MPU 211 and the casing cover 214, there is provided a heat receiving plate 110 for receiving heat generated by MPU 211, wherein the heat receiving plate 110 is integrated with the casing cover 214. At least one end portion of the heat receiving plate 110, there is provided a round hole portion 111. A heat pipe 100 described later is inserted into this round hole portion 111. Two hinge fixing members 262 are fixed into the casing recess 215 by screws 263. The round hole portion 111 is arranged between the two hinge fixing members 262, 262. One end portion of the heat pipe 100 is inserted into one of the hinge fixing members 262 and passes through the round hole 111. Then one end portion of the heat pipe 100 is inserted into the other hinge fixing member 262. Due to the foregoing arrangement, the heat receiving plate 110 and the casing cover 214 are opened and closed as a hinge around one end of the heat pipe 100.

In the above arrangement, when the heat receiving plate 110 closes the casing recess 215, it is fixed to the casing 210 by exchangeable screws 264, 264. At this time, the heat receiving plate 110 is closely contacted with one side of MPU 211. In this case, the other end of the heat pipe 100 is connected with a heat radiating member, by which heat can be mainly dissipated to the outside air, such as a key board panel (not shown) and a connector fixing metallic member (not shown) via a container 120.

It is preferable that a surface of the casing cover 214 is subjected to flocking treatment or plastic film coating treatment so that a quantity of sensitive heat can be reduced. In the above embodiment, the casing cover 214 and the heat receiving plate 110 are integrated with each other by adhesion and attached to the casing recess 215. When only the heat receiving plate 110 is composed of a hinge structure, the casing cover 214 may be composed in such a manner that it can be detached from the casing 210. In other words, both of them are not necessarily integrated with each other.

Figure 4:
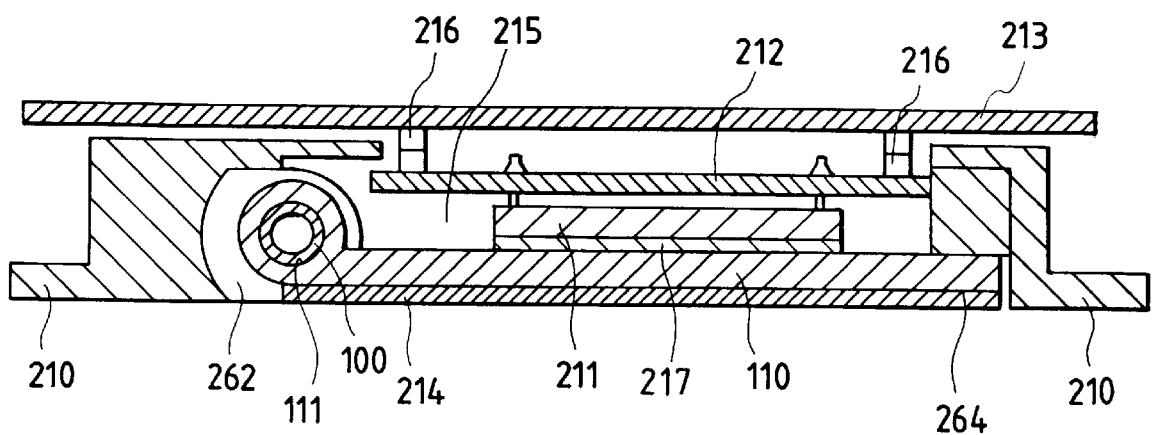
FIG. 4 is a cross sectional view of an alternate embodiment of the present invention.

In order to make MPU 211 closely come into contact with the heat receiving plate 110, that is, in order to enhance the heat conductivity between MPU 211 and the heat receiving plate 110, a sheet of high thermal conductivity 217 such as a silicon sheet may be provided between both of them as shown in FIG. 4. In this embodiment, the hinge fixing members 262 are arranged at both ends of the round hole portion 111. However, as long as the heat receiving plate 110 can be rotated around a portion of the heat pipe 100, the position and the number of the hinge fixing members 262 may be arbitrarily changed. Unlike the above embodiment in which the hinge fixing members 262 are formed separately from the casing 210, they may be formed integrally with the casing 210.

The round hole portion 111 may be formed by bending a portion of the flat heat receiving plate 110. Alternatively, the round hole portion 111 may be formed integrally with the heat receiving plate 110 by means of integral formation. The diameter of the round hole 111 may be made to be substantially the same as that of the heat pipe 100 to be inserted into it. Alternatively, slits may be formed in a portion of the round hole 111 or in the overall round hole 111 so that the inner diameter of the round hole 111 can be made to be variable and smaller than the diameter of the heat pipe 100. Due to the above arrangement, when the heat pipe 100 is inserted into the round hole 111, heat can be effectively transmitted from the heat receiving plate 110 to the heat pipe 100 because both are closely contacted with each other.

When the heat pipe of the above arrangement is used, it is possible to provide a high heat radiating effect without changing the shape of the main body casing of the information processing apparatus such as a conventional notebook type personal computer and also without changing the arrangement of components. That is, it is possible to provide a high heat radiating effect while the arrangement and shape of the conventional apparatus are used as they are. Accordingly, it is possible to quickly provide at low cost an information processing apparatus, in which an MPU card can be easily replaced with a new one meeting the demand of users, without greatly changing the design of the apparatus.

Since the frequency of opening and closing motions of the heat receiving plate 110 is very low, even if the round hole 111 and the heat pipe 100 are closely contacted with each other so as to enhance heat transmission, even if a lubricant such as grease is not applied to the heat pipe 100 used as a fulcrum, it is possible to provide an effectively high heat sink action by using the simple arrangement described above.

What is claimed is:

1. A heat sink used for a portable information processing apparatus, comprising:

a casing having a recess in which an exchangeable arithmetic processor is accommodated;

a heat receiving plate movably connected to said casing and movable from a first position in direct thermal contact with said arithmetic processor to a second position spaced apart from said arithmetic processor, said heat receiving plate having a round hole portion arranged at a portion extending from one end thereof;

a heat pipe inserted into said round hole portion; and a fixing member attached to said casing and connected to an outlet portion of said heat pipe, wherein said heat receiving plate is movably connected to said casing through said fixing member so that a hinge mechanism is formed by said heat receiving plate and said heat pipe, whereby said heat receiving plate is rotatably mounted to said heat pipe to facilitate rotation of said heat receiving plate between said first and second positions and at least a portion of said heat pipe is thermally connected with a radiation member.

2. The heat sink of claim 1, wherein an inner diameter of said round hole portion is substantially the same as an outer diameter of said heat pipe inserted thereinto.

3. The heat sink of claim 1, further comprising:

a sheet of high thermal conductivity disposed between said arithmetic processor and said heat receiving plate.

4. The heat sink of claim 3, wherein said sheet of high thermal conductivity is a silicon sheet.

5. The heat sink according to claim 1, wherein said arithmetic processor is adapted to be removed from said heat sink when said heat receiving plate is in said second position.

6. A combination heat sink and portable processing apparatus, said combination comprising:

a casing having a recess;

an arithmetic processor removably disposed within said recess;

a fixing member attached to said casing;

a longitudinally extending heat pipe secured to said fixing member;

a heat receiving plate rotatably mounted to said longitudinally extending heat pipe between a first position whereby said heat receiving plate is in direct thermal contact with said arithmetic processor to facilitate heat removal therefrom and a second position spaced apart from said arithmetic processor, wherein, when said heat receiving plate is in said second position, said arithmetic processor may be removed from said casing and when said heat receiving plate is in said first position said arithmetic processor is contained within said recess.

* * * * *